Patented Oct. 21, 1941

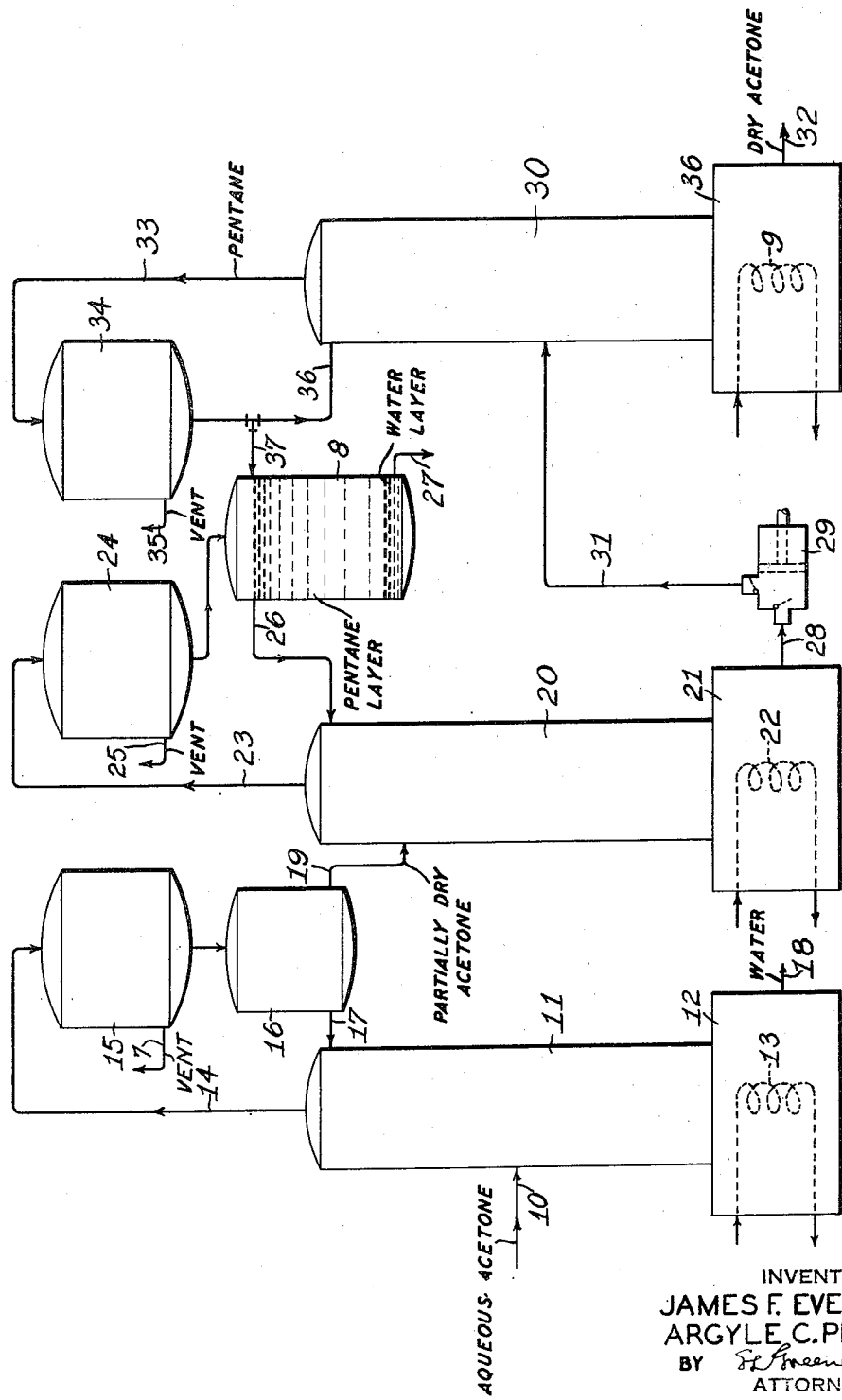

2,259,951

UNITED STATES PATENT OFFICE 2,259,951

DEHYDRATION OF ACETONE

James F. Eversole, Kenmore, N. Y., and Argyle C. Plewes, South Charleston, W. Va., assignors to Carbide and Carbon Chemicals Corporation, a corporation of New York Application April 8, 1939, Serial No. 266,776

9 Claims. (Cl. 202—42)

This invention is directed to an improved process for the preparation of anhydrous acetone.

Acetone is made commercially under such conditions that the crude product is almost always associated with considerable amounts of water. Acetone does not form a constant boiling mixture with water, so far as is known, and therefore aqueous acetone may be readily dehydrated by a simple distillation to form a refined product of quite high purity and low water content.

However, for the production of certain new artificial filaments and for the production of hypersensitive photographic films there is a requirement for acetone of extremely high purity containing only negligible amounts of water, for example 0.01% or less. Acetone of this degree of purity has heretofore been prepared by the use of dehydrating agents, such as calcium chloride, or by distilling the acetone in the presence of high boiling substances having great affinity for water, such as acetic anhydride. However, these methods are not generally practical for large-scale operation. The object of this invention is therefore to provide for the production of anhydrous acetone in commercial quantities in an economical manner.

This object is achieved by carrying out a series of distillations involving new and improved methods for the preparation of anhydrous acetone. The aqueous acetone is first subjected to a simple distillation whereby most of the water but not all is removed. The water content can readily be reduced in this step to a few tenths of one percent, but it cannot practically at least, be brought as low as 0.01%, even though, so far as is known, a constant boiling mixture is not formed. It is preferable that the amount of water removed in this operation be such as to minimize the total heat requirements throughout the series of distillations performed. It has been found by test that it is desirable to carry out this first distillation under such conditions of reflux and with such a degree of rectification that the water content of the partially dry acetone is between about 0.2% and about 2.0%. The second operation in our process involves a distillation of the partially dry acetone in contact with a liquid aliphatic hydrocarbon boiling from about 28° to about 100° C. Tests performed indicate that no other substance tried is as effective as this particular class of hydrocarbons in effecting the dehydration of acetone. For example, pure benzene, which is widely used in processes for the dehydration of ethyl alcohol by azeotropic distillation, is ineffective in accomplishing the dehydration of acetone. In this second distillation, a ternary mixture of water, acetone, and said aliphatic hydrocarbon is removed from the distillation column. Upon condensing this mixture, a condensate having two layers is formed, the upper layer being predominantly aliphatic hydrocarbon and the lower layer being predominantly water. The upper layer is returned to the second distillation as reflux and the water layer may be distilled independently to recover its acetone content or it may be returned to the first distillation as part of the aqueous acetone feed.

The lower section of the second distillation column will contain a mixture of practically anhydrous acetone with the liquid aliphatic hydrocarbon. This mixture may be conducted to a third distillation column wherein the anhydrous acetone is separated from the aliphatic hydrocarbon. Alternatively, the second distillation column may be provided with a greater number of plates and the aforesaid separation may be carried out in the lower section of the second distillation column.

The entire process may be carried out either in a batch or continuous manner, as desired.

The drawing is a diagrammatic flow sheet showing one modification of the process and the apparatus required for carrying it out.

In the drawing, aqueous acetone from a converter or other source is fed through a pipe 10 to some convenient point of a distilling column 11 equipped with a kettle 12 having a steam coil 13 as a source of heat. Vapors of partially dry acetone are removed from the column through a pipe 14 and condensed in a condenser 15 having a vent 7 and the liquid distillate is collected in a tank 16. Part of the distillate is returned through a pipe 17 as reflux to the column 11 in such amount as to maintain the composition of the distillate between about 0.2% and 2.0% of water. Water is removed from the kettle 12 through a pipe 18.

The part of the distillate not used for reflux is fed through a pipe 19 to a second distillation column 20 at some convenient point which may be near the top of the column. This column is also equipped with a kettle 21 having a steam coil 22 as a source of heat. At the start of the operations, this kettle is charged with an aliphatic hydrocarbon boiling from about 28° C. to about 100° C., for instance, pentane (which boils at 36° C.), and heat is applied until a condition of total reflux is established in the column. The partially dry acetone is then fed down the column in contact with the ascending vapors of the pentane, assuming this to be the hydrocarbon used, and the water is removed as a ternary mixture of water, acetone and pentane. This mixture is removed from the column as a vapor through a pipe 23 and is condensed in a condenser 24 which is vented to the atmosphere through a vent 25. The composition of the vapor in pipe 23 at atmospheric pressure is: Water, 0.52%; acetone, 20.16%; and pentane, 79.32%, all by weight. The condensed mixture is passed to a decanter 8 in which it rapidly separates into two sharply defined layers, the upper layer consisting of 78.8% pentane, 21% acetone, and 0.2% water, all by weight, and the lower layer consisting of 56% water, 44% acetone, and a trace of pentane, all by weight. The solubility relationship between these layers is such that 56% of the water contained in the ternary distillate may be removed per pass through the decanter. The upper pentane layer is returned through a pipe 26 to the column 20 as reflux and the lower water layer is withdrawn through a pipe 27 and it may be returned to column 11 as part of the aqueous acetone feed, or it may be separately treated to recover the contained acetone. Operating at atmospheric pressure, it is desirable to maintain a ratio of at least 350 pounds of ternary distillate distilled over for every pound of water in the partially dry acetone fed to the column 20.

In the kettle 21 of column 20 will collect a mixture of anhydrous acetone and pentane. This mixture may be withdrawn through a pipe 28 to a pump 29 and conducted through a pipe 31 to a third distillation column 30, having a steam coil 9 as a source of heat, in which column the pentane is separated from the acetone. The acetone collects in the kettle 36 and is removed through the pipe 32. The dry acetone is of exceptional purity and may have a water content as low as 0.005% or even lower.

The pentane is removed as a vapor through a pipe 33 and condensed in a condenser 34 having a vent 35 to the atmosphere. Part of the condensate is returned through a pipe 36 to the column 30 as reflux and part is returned to the column 20 by some convenient means. Some advantage in separation can be obtained by returning this part of the condensed pentane through a pipe 37 to the decanter 8.

The process outlined above is susceptible to modification. For example, the column 20 may be provided with a greater number of plates, or if a packed column is employed, by a greater depth of packing and the separation of the anhydrous acetone from the pentane may be carried out in the lower section of this column, and the anhydrous acetone withdrawn from the kettle 21.

The process may also be carried out under pressure and decided advantages in operation can be obtained thereby. For example, if the process is carried out at atmospheric pressure as outlined in the drawing, conditions affecting the separation in the decanter 8 will be such that about 220 volumes of pentane layer will be obtained per volume of water layer, whereas if a gauge pressure of 20 pounds per square inch be maintained on the column 20, about 80 volumes of pentane layer will be obtained per volume of water layer. This will result in a lesser amount of pentane evaporated per pound of water removed from the system with corresponding economy in steam requirements. Other advantages of operating under moderate pressures, such as from 10 to 50 pounds per square inch gauge, are that losses of volatile material from the system would be prevented in the closed system required and higher condensing temperatures could be used in the condenser 24 if such a course were desirable.

Other aliphatic hydrocarbons, both saturated and unsaturated, which boil from about 28° C. to about 100° C. may be used; and, as examples, may be mentioned methyl butane boiling at 28° C., 2,3-dimethylbutane boiling at 49.7° C., 2-methylpentane boiling at 60° C., or 3-methylpentane boiling at 64° C., normal hexane boiling at 69° C., and isoheptane boiling at 90.4° C. The use of the higher boiling hydrocarbons presents some advantage over the lower boiling hydrocarbons, such as pentane, in that, when the process is operated at atmospheric pressure and is vented to the air, higher condensing temperatures may be employed in the condenser 24 without loss of hydrocarbon. However, the higher boiling hydrocarbons are more difficult to separate from the acetone.

Other modifications of the invention other than as disclosed will be readily apparent to those skilled in the art and are included within the invention as defined by the appended claims.

We claim:

1. In a process for making substantially anhydrous acetone which includes rectifying aqueous acetone and recovering a distillate of reduced water content; the steps which comprise subjecting said distillate to a second distillation in contact with an aliphatic hydrocarbon boiling between about 28° C. and about 100° C. and recovering a second distillate consisting of water, acetone, and said aliphatic hydrocarbon; causing said second distillate to stratify and form a lower water-containing layer and an upper layer comprising said aliphatic hydrocarbon; returning said upper layer to the distillation apparatus; and separating substantially anhydrous acetone from a mixture of substantially anhydrous acetone and said aliphatic hydrocarbon formed as a higher boiling constituent in said second distillation.

2. In a process for making substantially anhydrous acetone which includes rectifying aqueous acetone and recovering a distillate of reduced water content; the steps which comprise subjecting said distillate to a second distillation in contact with pentane and recovering a second distillate consisting of water, acetone, and petane; causing second distillate to stratify and form a lower water-containing layer and an upper layer comprising pentane; returning said upper layer to the distillation apparatus; and separating substantially anhydrous acetone from a mixture of substantially anhydrous acetone and pentane formed as a higher boiling constituent in said second distillation.

3. In a process for making substantially anhydrous acetone which includes rectifying aqueous acetone and recovering distillate containing from about 0.2% to about 2.0% water; the steps which comprise subjecting said distillate to a second distillation in contact with an aliphatic hydrocarbon boiling between about 28° C., and about 100° C. and recovering a second distillate consisting of water, acetone, and said aliphatic hydrocarbon; causing said second distillate to stratify and form a lower water-containing layer and an upper layer comprising said aliphatic hydrocarbon; returning said upper layer to the distillation apparatus; and separating substantially anhydrous acetone from a mixture of substantially anhydrous acetone and said aliphatic hydrocarbon formed as a higher boiling constituent in said second distillation.

4. In a process for making substantially anhydrous acetone which includes rectifying aqueous acetone and recovering a distillate containing from about 0.2% to about 2.0% water; the steps which comprise subjecting said distillate to a second distillation in contact with pentane and recovering a second distillate consisting of water, acetone, and pentane; causing said second distillate to stratify and form a lower water-containing layer and an upper layer comprising pentane; returning said upper layer to the distillation apparatus; and separating substantially anhydrous acetone from a mixture of substantially anhydrous acetone and pentane formed as a higher boiling constituent in said second distillation.

5. In a process for making substantially anhydrous acetone which includes rectifying aqueous acetone and recovering a distillate of reduced water content; the steps which comprise subjecting said distillate to a second distillation in contact with an aliphatic hydrocarbon boiling between about 28° C. and about 100° C., and recovering a second distillate consisting of water, acetone, and said aliphatic hydrocarbon; causing said second distillate to stratify and form a lower water-containing layer and an upper layer comprising said aliphatic hydrocarbon; returning said upper layer to the distillation apparatus; and recovering a mixture of anhydrous acetone and said aliphatic hydrocarbon as a residue of said second distillation and subjecting said mixture to a separate distillation to recover pure anhydrous acetone.

6. In a process for making substantially anhydrous acetone which includes rectifying aqueous acetone and recovering a distillate of reduced water content; the steps which comprise subjecting said distillate to a second distillation in contact with pentane and recovering a second distillate consisting of water, acetone, and pentane; causing said second distillate to stratify and form a lower water-containing layer and an upper layer comprising pentane; returning said upper layer to the distillation apparatus; and recovering a mixture of anhydrous acetone and pentane as a residue of said second distillation and subjecting said mixture to a third distillation to recover pure anhydrous acetone.

7. In a process for making substantially anhydrous acetone, the step which comprises subjecting an aqueous mixture of acetone to distillation in contact with an aliphatic hydrocarbon boiling between about 28° C., and about 100° C., and recovering a distillate consisting of water, acetone, and said aliphatic hydrocarbon; causing said distillate to stratify and form a lower water-containing layer and an upper layer comprising said aliphatic hydrocarbon; returning said upper layer to the distillation apparatus; and separating substantially anhydrous acetone from a mixture of substantially anhydrous acetone and said aliphatic hydrocarbon formed as a higher boiling constituent in said second distillation.

8. In a process for making substantially anhydrous acetone, the step which comprises subjecting an aqueous mixture of acetone to distillation in contact with pentane and recovering a distillate consisting of water, acetone, and pentane; causing said distillate to stratify and form a lower water-containing layer and an upper layer comprising pentane; returning said upper layer to the distillation apparatus; and separating substantially anhydrous acetone from a mixture of substantially anhydrous acetone and pentane formed as a higher boiling constituent in said second distillation.

9. Process for making substantially anhydrous acetone which comprises rectifying aqueous acetone and recovering a distillate of reduced water content; subjecting said distillate to a second distillation under a pressure of from 10 to 50 pounds per square inch gauge in contact with an aliphatic hydrocarbon boiling between about 28° C. and about 100° C. and recovering a second distillate consisting of water, acetone, and said aliphatic hydrocarbon; causing said second distillate to stratify and form a lower water-containing layer and an upper layer comprising said aliphatic hydrocarbon; returning said upper layer to the distillation apparatus; and separating substantially anhydrous acetone from a mixture of substantially anhydrous acetone and said aliphatic hydrocarbon formed as a higher boiling constituent in said second distillation.

JAMES F. EVERSOLE.
ARGYLE C. PLEWES.